United States Patent
Chen et al.

(10) Patent No.: US 11,682,045 B2
(45) Date of Patent: Jun. 20, 2023

(54) AUGMENTED REALITY ADVERTISEMENTS ON OBJECTS

(71) Applicant: Samsung Electronics Co., Ltd, Suwon-si (KR)

(72) Inventors: Zhitu Chen, Mountain View, CA (US); Xiang Sun, Campbell, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 15/636,360

(22) Filed: Jun. 28, 2017

(65) Prior Publication Data

US 2019/0005546 A1 Jan. 3, 2019

(51) Int. Cl.
| | |
|---|---|
| *G06Q 30/00* | (2023.01) |
| *G06Q 30/0251* | (2023.01) |
| *G06T 7/60* | (2017.01) |
| *G06T 7/11* | (2017.01) |
| *G06T 19/00* | (2011.01) |
| *G06Q 30/0241* | (2023.01) |
| *G06V 10/20* | (2022.01) |
| *G06V 20/10* | (2022.01) |

(Continued)

(52) U.S. Cl.
CPC ..... *G06Q 30/0267* (2013.01); *G06Q 30/0277* (2013.01); *G06T 7/11* (2017.01); *G06T 7/60* (2013.01); *G06T 19/006* (2013.01); *G06V 10/255* (2022.01); *G06V 20/10* (2022.01); *H04L 67/131* (2022.05); *G02B 27/0172* (2013.01); *G02B 2027/014* (2013.01); *G02B 2027/0138* (2013.01); *G02B 2027/0178* (2013.01); *G06T 2207/10028* (2013.01); *H04L 67/10* (2013.01)

(58) Field of Classification Search
None
See application file for complete search history.

(56) References Cited

U.S. PATENT DOCUMENTS

| | | |
|---|---|---|
| 6,100,925 A | 8/2000 | Rosser et al. |
| 6,403,597 B1 | 6/2002 | Wilson et al. |

(Continued)

FOREIGN PATENT DOCUMENTS

| | | |
|---|---|---|
| KR | 10-2012-0025211 A | 3/2012 |
| KR | 10-1519047 B1 | 5/2015 |

(Continued)

OTHER PUBLICATIONS

Golovinskly, Aleksey et al., "Shape-based Recognition of 3D Point Clouds in Urban Environment", IEEE, IEEE 12th International Conference on Computer Vision (ICCV), 2009, 2154-2161 (Year: 2009).*

(Continued)

*Primary Examiner* — Michael Bekerman

(57) ABSTRACT

An electronic device includes an image capture device and a processor. The image capture device captures an image of an environment. The processor is coupled to the image capture device and is configured to receive the image of the environment and determine situational contextual information in the image. The processor also identifies at least one non-intrusive location and performs shape detection on the at least one non-intrusive location. An advertisement asset is received based on the determined situational contextual information and the shape detection.

20 Claims, 10 Drawing Sheets

(51) Int. Cl.
*H04L 67/131* (2022.01)
*H04L 67/10* (2022.01)
*G02B 27/01* (2006.01)

(56) References Cited

U.S. PATENT DOCUMENTS

| | | | |
|---|---|---|---|
| 7,073,129 B1* | 7/2006 | Robarts | G06Q 10/10 |
| | | | 463/36 |
| 7,342,166 B2 | 3/2008 | Kay | |
| 7,796,781 B2 | 9/2010 | Echigo et al. | |
| 7,849,227 B2 | 12/2010 | Kashiyama et al. | |
| 7,882,087 B2 | 2/2011 | Johnson | |
| 7,994,930 B2 | 8/2011 | Gajdos et al. | |
| 8,220,020 B2 | 7/2012 | Deshpande | |
| 8,413,182 B2 | 4/2013 | Bill | |
| 8,477,246 B2 | 7/2013 | Saxena et al. | |
| 8,527,345 B2 | 9/2013 | Rothschild et al. | |
| 8,655,718 B2 | 2/2014 | Athsani et al. | |
| 8,682,925 B1 | 3/2014 | Marquardt et al. | |
| 8,711,176 B2* | 4/2014 | Douris | G06F 16/487 |
| | | | 345/633 |
| 8,745,070 B2 | 6/2014 | Krishnamurthy et al. | |
| 8,850,471 B2 | 9/2014 | Kilar et al. | |
| 8,910,201 B1 | 12/2014 | Zamiska et al. | |
| 8,922,617 B2 | 12/2014 | Mexandrov et al. | |
| 8,933,931 B2* | 1/2015 | Balan | G06T 19/006 |
| | | | 345/419 |
| 8,949,889 B1 | 2/2015 | Erdmann | |
| 8,954,377 B1 | 2/2015 | Turon et al. | |
| 8,977,293 B2* | 3/2015 | Rodriguez | G01C 21/20 |
| | | | 455/456.1 |
| 9,009,083 B1 | 4/2015 | Shetty et al. | |
| 9,078,048 B1 | 7/2015 | Gargi et al. | |
| 9,224,156 B2 | 12/2015 | Moorer | |
| 9,264,711 B2 | 2/2016 | Gordon et al. | |
| 9,269,015 B2 | 2/2016 | Boncyk et al. | |
| 9,272,203 B2 | 3/2016 | Zalewski | |
| 9,272,209 B2 | 3/2016 | Perlman et al. | |
| 9,286,721 B2 | 3/2016 | Adhikari et al. | |
| 9,317,972 B2 | 4/2016 | Forutanpour et al. | |
| 9,384,594 B2 | 7/2016 | Maciocci et al. | |
| 9,584,844 B2 | 2/2017 | Onno et al. | |
| 9,888,105 B2* | 2/2018 | Rhoads | H04N 5/23229 |
| 9,984,499 B1* | 5/2018 | Jurgenson | G06T 19/006 |
| 10,091,556 B1 | 10/2018 | Liden et al. | |
| 10,354,291 B1* | 7/2019 | Teller | G06Q 30/0276 |
| 2002/0037828 A1 | 3/2002 | Wilson et al. | |
| 2003/0028432 A1 | 2/2003 | Troyansky et al. | |
| 2006/0173743 A1 | 8/2006 | Bollay | |
| 2007/0124762 A1 | 5/2007 | Chickering et al. | |
| 2008/0104634 A1 | 5/2008 | Gajdos et al. | |
| 2008/0109306 A1 | 5/2008 | Maigret et al. | |
| 2008/0172293 A1 | 7/2008 | Raskin et al. | |
| 2009/0030774 A1 | 1/2009 | Rothschild et al. | |
| 2009/0061901 A1* | 3/2009 | Arrasvuori | H04L 67/18 |
| | | | 455/456.3 |
| 2009/0094113 A1 | 4/2009 | Berry et al. | |
| 2010/0023398 A1 | 1/2010 | Brown et al. | |
| 2010/0088716 A1 | 4/2010 | Ellanti et al. | |
| 2011/0041153 A1 | 2/2011 | Simon et al. | |
| 2011/0153414 A1 | 6/2011 | Elvekrog et al. | |
| 2011/0173071 A1 | 7/2011 | Meyer et al. | |
| 2011/0184805 A1* | 7/2011 | Margalit | G06Q 30/02 |
| | | | 705/14.49 |
| 2012/0011540 A1 | 1/2012 | Pulford | |
| 2012/0021532 A1 | 1/2012 | Eszter et al. | |
| 2012/0059720 A1* | 3/2012 | Musabji | G06T 17/05 |
| | | | 705/14.58 |
| 2012/0086727 A1* | 4/2012 | Korah | G06F 3/03 |
| | | | 345/633 |
| 2012/0100915 A1 | 4/2012 | Margalit et al. | |
| 2012/0110616 A1 | 5/2012 | Kilar et al. | |
| 2012/0116920 A1 | 5/2012 | Adhikari et al. | |
| 2012/0167133 A1 | 6/2012 | Carroll et al. | |
| 2012/0229909 A1 | 9/2012 | Clavin et al. | |
| 2012/0242678 A1 | 9/2012 | Border et al. | |
| 2012/0290387 A1* | 11/2012 | Davis | G06Q 30/02 |
| | | | 705/14.49 |
| 2013/0002649 A1* | 1/2013 | Wu | G06T 19/006 |
| | | | 345/419 |
| 2013/0073473 A1 | 3/2013 | Heath | |
| 2013/0265333 A1 | 10/2013 | Ainsworth et al. | |
| 2013/0276024 A1* | 10/2013 | Grant | G06Q 30/0269 |
| | | | 725/34 |
| 2013/0278734 A1 | 10/2013 | Yang et al. | |
| 2014/0013342 A1 | 1/2014 | Swan et al. | |
| 2014/0052540 A1 | 2/2014 | Rajaram et al. | |
| 2014/0063061 A1* | 3/2014 | Reitan | G09G 3/003 |
| | | | 345/633 |
| 2014/0136337 A1 | 5/2014 | Ringdahl | |
| 2014/0164125 A1* | 6/2014 | Taylor | G06Q 30/0261 |
| | | | 705/14.58 |
| 2014/0168262 A1 | 6/2014 | Forutanpour et al. | |
| 2014/0236729 A1 | 8/2014 | Sidi et al. | |
| 2014/0253589 A1* | 9/2014 | Tout | G06K 19/06159 |
| | | | 345/633 |
| 2014/0289188 A1 | 9/2014 | Shimanovsky et al. | |
| 2014/0310098 A1 | 10/2014 | Epperson et al. | |
| 2014/0317244 A1 | 10/2014 | Pantos et al. | |
| 2014/0357312 A1* | 12/2014 | Davis | G06F 3/04842 |
| | | | 455/550.1 |
| 2015/0081452 A1 | 3/2015 | Anthony | |
| 2015/0082203 A1 | 3/2015 | James et al. | |
| 2015/0082341 A1 | 3/2015 | Rosenbaum et al. | |
| 2015/0143416 A1 | 5/2015 | Onno et al. | |
| 2015/0172563 A1 | 6/2015 | Jakobson et al. | |
| 2015/0199995 A1 | 7/2015 | Silverstein et al. | |
| 2015/0206343 A1* | 7/2015 | Mattila | H04W 4/02 |
| | | | 345/420 |
| 2015/0206349 A1* | 7/2015 | Rosenthal | H04N 5/232935 |
| | | | 345/633 |
| 2015/0206353 A1 | 7/2015 | Grasso et al. | |
| 2015/0213778 A1* | 7/2015 | Moravetz | G06F 3/017 |
| | | | 345/520 |
| 2015/0235267 A1* | 8/2015 | Steube | H04N 21/4223 |
| | | | 705/14.58 |
| 2015/0245111 A1 | 8/2015 | Berry et al. | |
| 2015/0269384 A1 | 9/2015 | Holman et al. | |
| 2015/0302470 A1 | 10/2015 | Dru et al. | |
| 2015/0350563 A1 | 12/2015 | Hendricks et al. | |
| 2016/0004750 A1 | 1/2016 | Marquardt et al. | |
| 2016/0026253 A1* | 1/2016 | Bradski | H04N 13/344 |
| | | | 345/8 |
| 2016/0034042 A1* | 2/2016 | Joo | G02B 27/0093 |
| | | | 345/633 |
| 2016/0042250 A1 | 2/2016 | Cordova-Diba et al. | |
| 2016/0050465 A1 | 2/2016 | Zaheer et al. | |
| 2016/0092484 A1 | 3/2016 | Finkler | |
| 2016/0112729 A1 | 4/2016 | Sayed et al. | |
| 2016/0140614 A1 | 5/2016 | Brubaker | |
| 2016/0148433 A1* | 5/2016 | Petrovskaya | G02B 27/01 |
| | | | 345/633 |
| 2016/0196603 A1 | 7/2016 | Perez et al. | |
| 2016/0209648 A1 | 7/2016 | Haddick et al. | |
| 2016/0212455 A1 | 7/2016 | Manna | |
| 2017/0039771 A1 | 2/2017 | Chowdhary et al. | |
| 2017/0178156 A1 | 6/2017 | Bruich et al. | |
| 2017/0374398 A1 | 12/2017 | Rao et al. | |
| 2018/0013977 A1 | 1/2018 | Martineau | |
| 2018/0143756 A1* | 5/2018 | Mildrew | G06F 3/0482 |
| 2018/0192160 A1 | 7/2018 | Ravindran et al. | |
| 2018/0260843 A1* | 9/2018 | Hiranandani | G06Q 30/0631 |
| 2018/0315248 A1* | 11/2018 | Bastov | G06F 3/04815 |
| 2018/0357833 A1* | 12/2018 | Biganski | A63F 13/211 |
| 2018/0374273 A1* | 12/2018 | Holzer | G06T 19/20 |
| 2020/0219312 A1* | 7/2020 | Jurgenson | G06T 19/006 |

FOREIGN PATENT DOCUMENTS

| | | |
|---|---|---|
| WO | 0237828 A2 | 5/2002 |
| WO | 2011094734 A2 | 8/2011 |
| WO | WO2011094734 A2 | 8/2011 |

(56) References Cited

FOREIGN PATENT DOCUMENTS

| WO | 2016028813 A1 | 2/2016 |
|---|---|---|
| WO | WO2016028813 A1 | 2/2016 |
| WO | 2016109056 A1 | 7/2016 |

OTHER PUBLICATIONS

Mian, Ajmal S. et al., "Three-Dimensional Model-Based Object Recognition and Segmentation in Cluttered Scenes", IEEE Transactions on Pattern Analysis and Machine Intelligence, col. 28, No. 10, Oct. 2006, 1584-1601 (Year: 2006).*
Hwang, Alex D., and Eli Peli. "An Augmented-Reality Edge Enhancement Application for Google Glass." Optometry and Vision Science 91.8 (2014): 1021Y1030. (Year: 2014).*
USPTO, Non-Final Office Action for U.S. Appl. No. 15/616,290 dated Sep. 17, 2018, 31 pages.
Cohen, et al., "Maintaining Time-Decaying Stream Aggregates" Jan. 25, 2005, pp. 1-16, Elsevier, United States. (16 pages).
International Search Report dated Oct. 19, 2018 in connection with International Patent Application No. PCT/KR2018/007359, 5 pages.
Written Opinion of the International Searching Authority dated Oct. 19, 2018 in connection with International Patent Application No. PCT/KR2018/007359, 8 pages.
U.S. Office Action for U.S. Appl. No. 15/473,272, dated Mar. 26, 2018. (21 pages).
ISA/KR, "International Search Report and Written Opinion of the International Searching Authority," International Application No. PCT/KR2018/006420, dated Oct. 22, 2018, 10 pages.
Rosman, B. et al., "Learning Spatial Relationships between Objects", Journal International Journal of Robotics Research archive, Sep. 30, 2011, pp. 1328-1342, vol. 30, No. 11, United Kingdom, 15 pages.
ISA/KR, International Search Report and Written Opinion of the International Searching Authority, International Application No. PCT/KR2017/008745, dated Nov. 30, 2017, 11 pages.
U.S. Appl. No. 15/616,290, filed Jun. 7, 2017, first named inventor is Justin C. Martineau.
U.S. Appl. No. 15/473,272, filed Mar. 29, 2017, first named inventor is Sourabh Ravindran.
Office Action dated Mar. 12, 2019 in connection with U.S. Appl. No. 15/616,290, 20 pages.
Notice of Allowance dated Jun. 12, 2019 in connection with U.S. Appl. No. 15/473,272, 23 pages.
Office Action dated Jun. 6, 2019 in connection with U.S. Appl. No. 15/616,290, 7 pages.
Notice of Allowance dated May 1, 2019 in connection with U.S. Appl. No. 15/473,272, 8 pages.
Office Action dated Aug. 8, 2019 in connection with U.S. Appl. No. 15/616,290, 28 pages.
Notice of Allowance and Fee(s) Due for U.S. Appl. No. 15/473,272, dated Oct. 18, 2019, 17 pages.
Extended European Search Report dated Jul. 2, 2019 for European Application No. 17889825.0 from European Patent Office, 11 pages.
Office Action dated Jan. 17, 2020 in connection with U.S. Appl. No. 15/616,290, 22 pages.
Extended European Search Report regarding Application No. 18825265. 4, dated Mar. 17, 2020, 9 pages.
Examination Report dated Jan. 30, 2023 in connection with European Patent Application No. 18825265.4, 10 pages.
First Office Action dated Mar. 23, 2023 in connection with Chinese Patent Application No. 201880043691 X, 23 pages.
Decision to Refuse a European Patent Application dated Mar. 30, 2023 in connection with European Patent Application No. 18825265. 4, 17 pages.

* cited by examiner

AUGMENTED REALITY ADVERTISEMENTS ON OBJECTS

TECHNICAL FIELD

This disclosure relates generally to displaying images or video. More specifically, this disclosure relates to a method and apparatus for presenting an augmented reality display with three-dimensional images overlaid on objects in a local environment.

BACKGROUND

Augmented reality refers to a technology for augmenting a real image by adding virtual information or graphics. The virtual information may be, for example, a text or a graphic image displayed on a micro display, and the real image may include information about a real object observed within a field of view of a device. Augmented reality may be provided by using a method of outputting an image photographed by a camera or the like and adding information about an object included in the image, such as a person, a thing, or the like, to the photographed image. In another method, augmented reality may be obtained via a head-mounted display apparatus or a heads-up display apparatus, such as GOOGLE GLASS®, which does not directly output a photographed image, but outputs only information about an object included in the photographed image.

Currently, advertising using augmented reality consists of static pop-up windows or banners. There is no method of displaying an advertisement so that the advertisement blends into the user's field of view when a user is using an augmented reality device.

SUMMARY

The present disclosure relates to devices and methods for reproducing information on an augmented reality device.

In a first embodiment, an electronic device includes an image capture device and a processor. The image capture device captures an image of an environment. The processor is coupled to the image capture device and is configured to receive the image of the environment and determine situational contextual information in the image. The processor also identifies at least one non-intrusive location and performs shape detection on the at least one non-intrusive location. An advertisement asset is received based on the determined situational contextual information and the shape detection.

In a second embodiment, a method for displaying a three-dimensional (3D) image includes receiving an image of an environment and determining situational contextual information in the image. The method also includes identifying at least one non-intrusive location, performing shape detection on the at least one non-intrusive location, and receiving an advertisement asset based on the determined situational contextual information and the shape detection.

In a third embodiment, an electronic device includes a memory configured to store a plurality of assets and a processor. The processor is configured to receive an image of an environment and determine situational contextual information in the image. The processor also identifies at least one non-intrusive location, performs shape detection on the at least one non-intrusive location, and selects an advertisement asset based on the determined situational contextual information and the shape detection.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged device or system.

Figure 1:
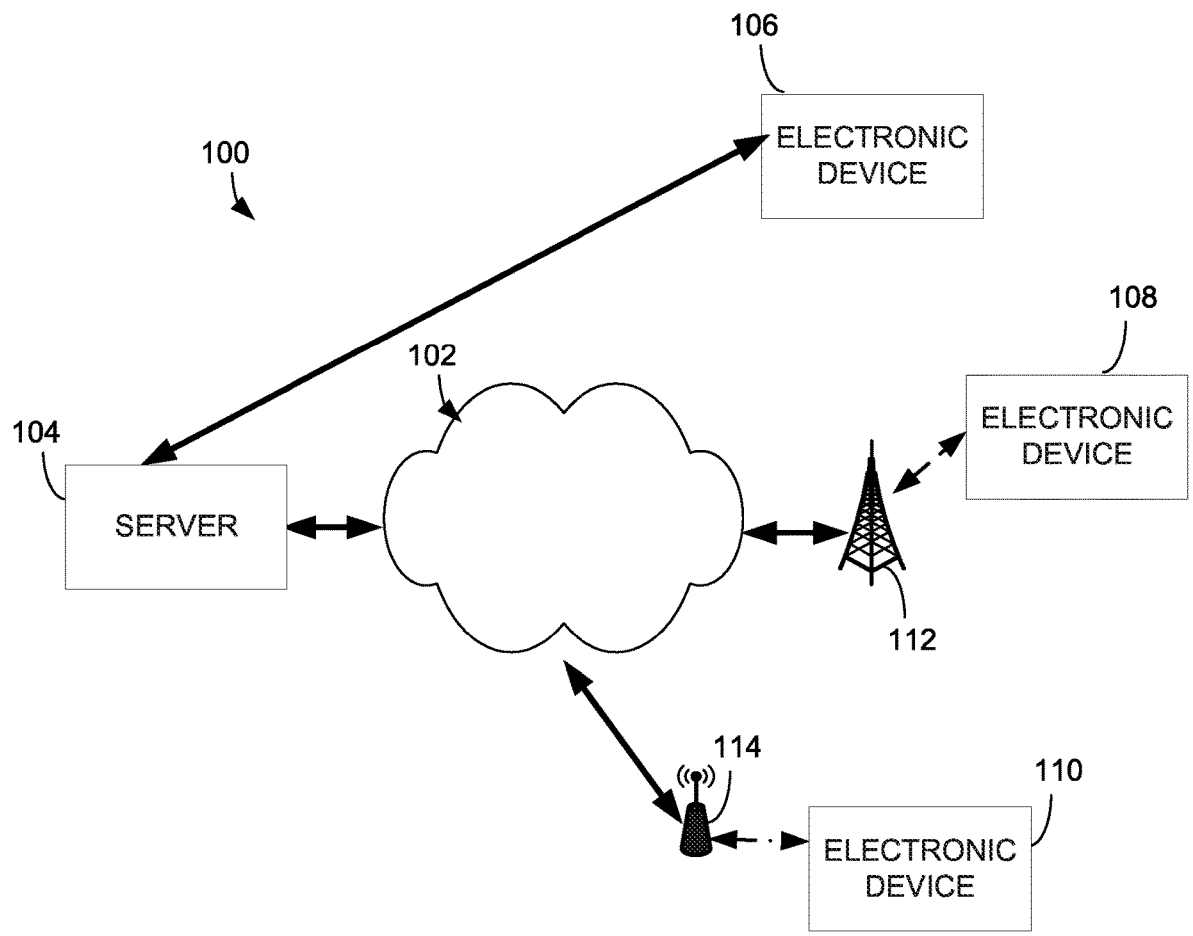
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between the server 104 and various electronic devices 106-110. The electronic devices 106-110 may be, for example, a smartphone, a wearable device, or head-mounted display (HMD). The server 104 includes any suitable computing or processing device that can provide computing services for one or more client devices. Each server 104 could, for example, include one or more processing devices, one or more memories storing instructions and data, and one or more network interfaces facilitating communication over the network 102.

In this example, the electronic device 106 can communicate directly with the server 104 using WI-FI®, BLUETOOTH®, or any short range communication protocols. Some electronic devices 108 and 110 communicate indirectly with the network 102. For example, the electronic device 108 communicates via one or more base stations 112, such as cellular base stations or eNodeBs. Also, the electronic device 110 communicates via one or more wireless access points 114, such as IEEE 802.11 wireless access points. Note that these are for illustration only and that each client device could communicate directly with the network 102 or indirectly with the network 102 via any suitable intermediate device(s) or network(s).

As described in more detail below, the server 104 provides images and/or video to electronic devices 106-110 to generate an augmented reality image or video.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
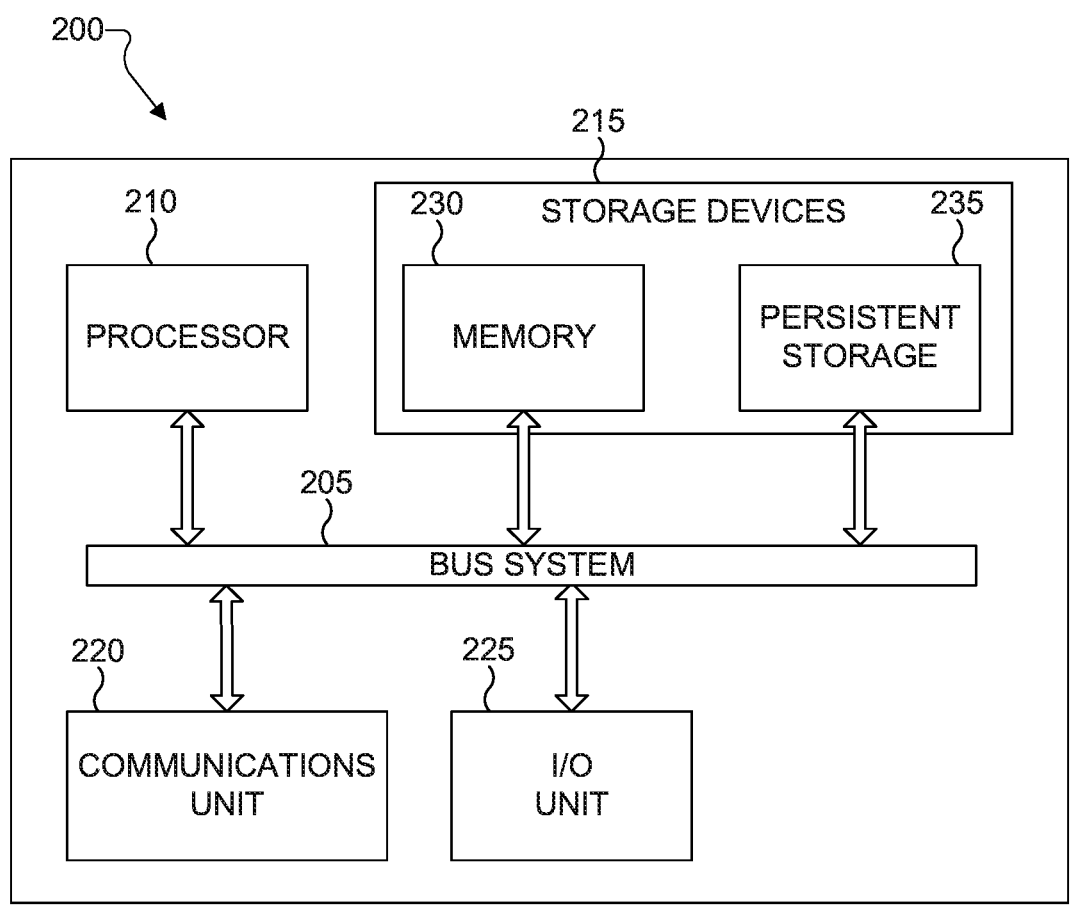
FIG. 2 illustrates an example server in a computing system according to this disclosure.
Figure 3:
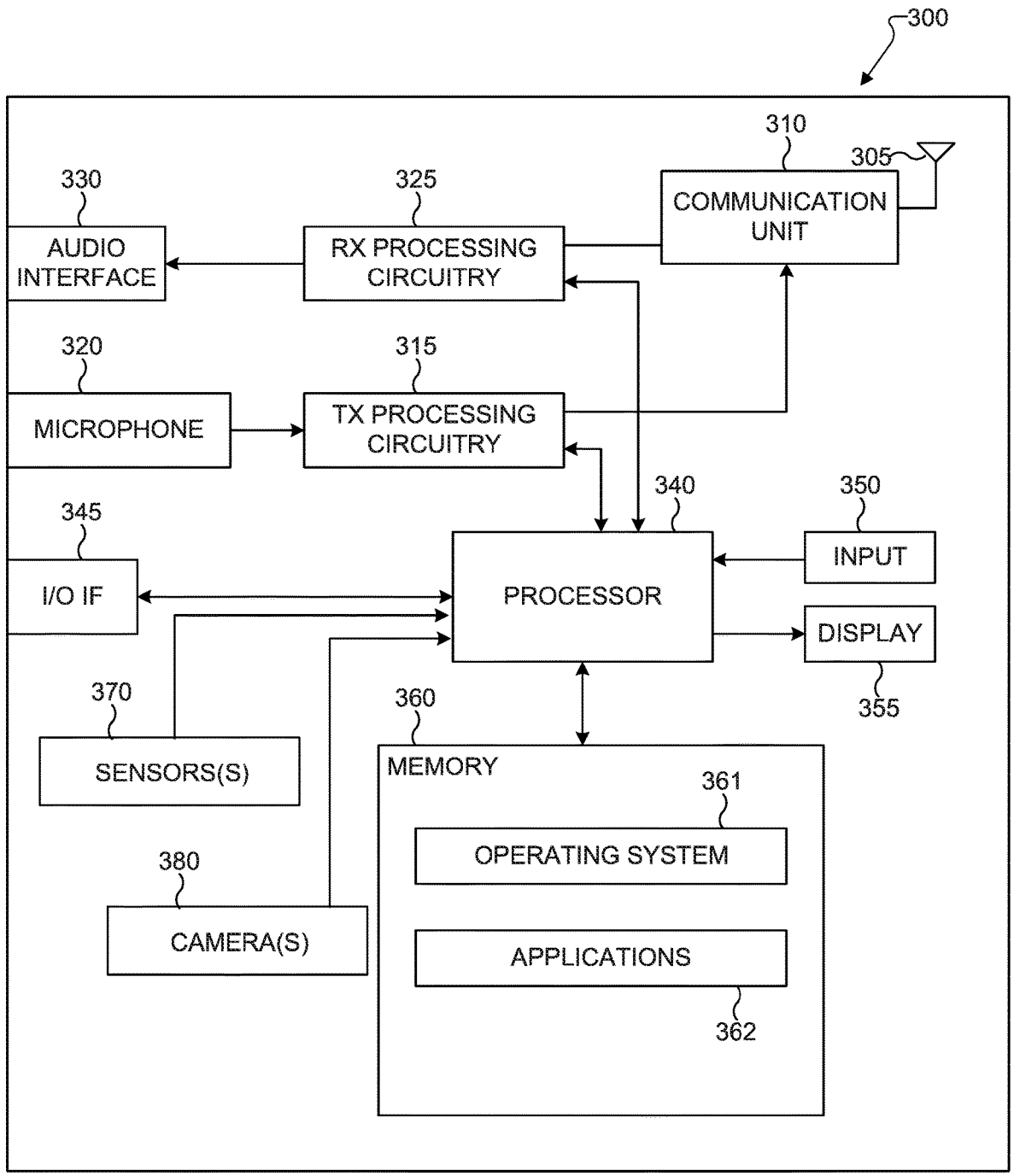
FIG. 3 illustrates an example electronic device according to this disclosure.

FIGS. 2 and 3 illustrate example devices in a computing system according to this disclosure. In particular, FIG. 2 illustrates an example server 200, and FIG. 3 illustrates an example electronic device 300. The server 200 could represent the server 104 in FIG. 1, and the electronic device 300 could represent the electronic devices 106-110 in FIG. 1.

As shown in FIG. 2, the server 200 includes a bus system 205, which supports communication between at least one processor 210, at least one storage device 215, and at least one communications unit 220.

The processor 210 executes instructions that may be loaded into a memory 230. The processor 210 may include any suitable number(s) and type(s) of processors or other devices in any suitable arrangement. Example types of processors 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc. Memory 230 stores an application thereon that is used to control one or more functions of the server 200.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

In some embodiments, the server 200 may include an I/O unit 225 that allows for input and output of data. For example, the I/O unit 225 may provide a connection for user input through a keyboard, mouse, keypad, touchscreen, or other suitable input device. The I/O unit 225 may also send output to a display, printer, or other suitable output device.

As described in more detail below, advertisers may upload content to the server for display on the electronic device.

Although FIG. 2 illustrates one example of a server 200, various changes may be made to FIG. 2. For example, the server 200 could include any number of each component shown in FIG. 2.

Figure 4A:
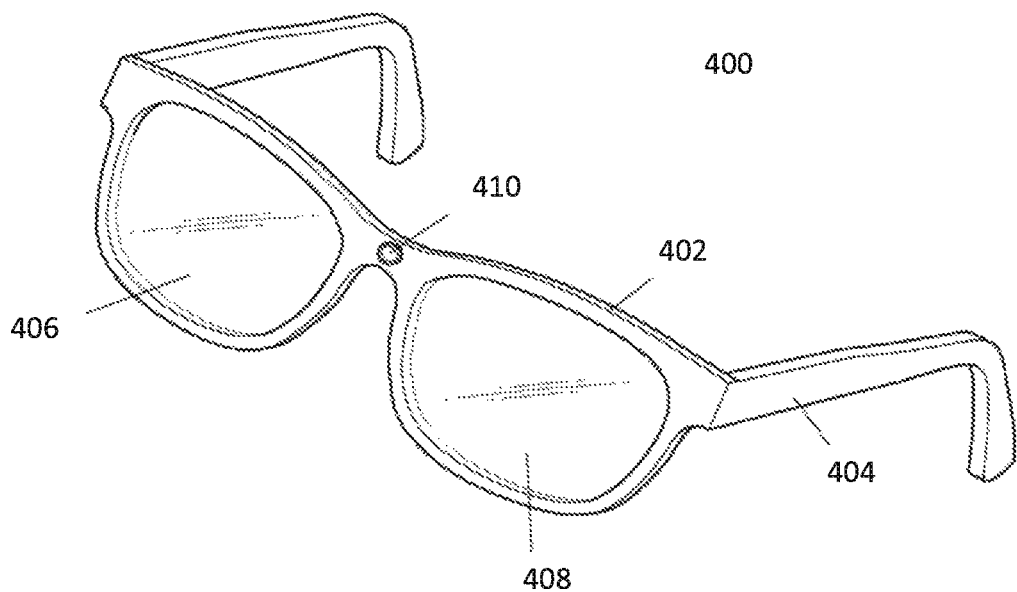
FIG. 4A illustrates a perspective view of a head mounted display (HMD) according to this disclosure.
Figure 4B:
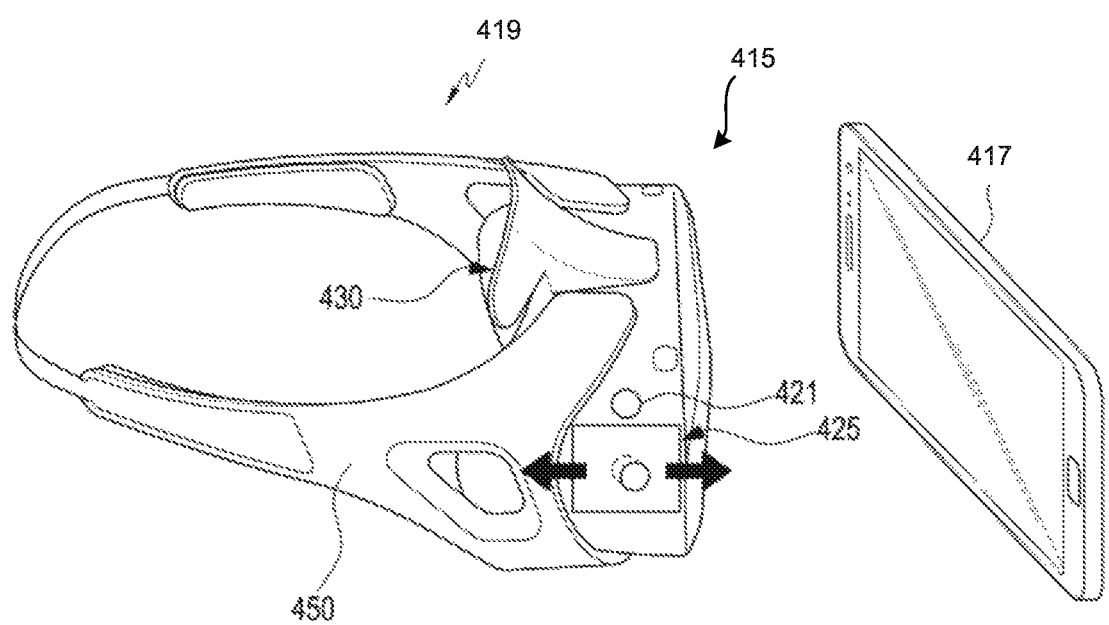
FIG. 4B illustrates a perspective view of another HMD according to this disclosure.

FIG. 3 illustrates an example electronic device 300 according to this disclosure. The embodiment of the electronic device 300 illustrated in FIG. 3 is for illustration only, and the electronic devices 106-110 of FIG. 1 could have the same or similar configuration. However, electronic devices come in a wide variety of configurations, and FIG. 3 does not limit the scope of this disclosure to any particular implementation of an electronic device. In one or more embodiments of this disclosure, the electronic device 300 may be replaced by a HMD as shown in FIG. 4A or 4B.

As shown in FIG. 3, the electronic device 300 includes a communication unit 310. The communication unit 310 may include, for example, a RF transceiver, a Bluetooth transceiver, or a WiFi transceiver. The electronic device 300 may also include transmit (TX) processing circuitry 315, a microphone 320, and receive (RX) processing circuitry 325. The electronic device 300 also includes an audio interface 330, a processor 340, an input/output (I/O) interface (IF) 345, an input 350, a display 355, and a memory 360. The memory 360 includes an operating system (OS) program 361 and one or more applications 362.

The "communication unit 310" may receive an incoming RF signal such as, e.g., a BLUETOOTH® signal or a WI-FI® signal. The "communication unit 310" may down convert the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The communication unit 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the basic OS program 361 stored in the memory 360 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the electronic device 300 with the ability to connect to other devices such as laptop computers and handheld computers. The I/O interface 345 is the communication path between these accessories and the processor 340.

The processor 340 is also coupled to the input 350 and the display 355. The operator of the electronic device 300 can use the input 350 (e.g., keypad, touchscreen, button etc.) to enter data into the electronic device 300. The display 355 may be a liquid crystal display, a light-emitting diode (LED) display, an optical LED (OLED), an active matrix OLED (AMOLED), a transparent or opaque display such one or more lenses on a pair of augmented reality glasses where one or more images may be projected onto or displayed using the lens, or other display capable of rendering text and/or at least limited graphics, such as from web sites. In one embodiment, the input 350 is a touchscreen. The touchscreen could include a touch panel, a (digital) pen sensor, a key, or an ultrasonic input device. The touchscreen could recognize, for example, a touch input in at least one scheme among a capacitive scheme, a pressure sensitive scheme, an infrared scheme, or an ultrasonic scheme. The touchscreen could also include a control circuit. In the capacitive scheme, the touchscreen could recognize touch or proximity.

The memory 360 is coupled to the processor 340. Part of the memory 360 could include a random access memory (RAM), and another part of the memory 360 could include a Flash memory or other read-only memory (ROM).

Electronic device 300 may further include one or more sensors 370 that can meter a physical quantity or detect an activation state of the electronic device 300 and convert metered or detected information into an electrical signal. For example, sensor 370 may include one or more buttons for touch input, e.g., on the headset or the electronic device 300, one or more cameras 380, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (e.g., a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 370 can further include a control circuit for controlling at least one of the sensors included therein. As will be discussed in greater detail below, one or more of these sensor(s) 370 may be used to control a UI, detect UI inputs, determine the orientation and facing direction of the user for 3D content display identification, etc. Any of these sensor(s) 370 may be located within the electronic device 300, within a headset configured to hold the electronic device 300, or in both the headset and electronic device 300, for example, in embodiments where the electronic device 300 includes a headset.

Electronic device 300 may also include one or more cameras 380. Camera 380 may be a red, green, blue (RGB) camera or an infrared camera. As will be discussed below, camera 380 may be used to capture images and/or video of an environment and track one or more objects in the environment, to track a user's eye to perform functions, or to track hand and/or finger gestures. In order to track a user's eye, the camera 380 may face internally relative to the electronic device 300 to capture a portion of the user's head. In order to track the one or more objects or hand and/or finger gestures, the camera 380 may face externally relative to the electronic device 300.

The electronic device 300 locates and tracks the objects in a 3D physical space using computer vision (CV) and the camera 380. The electronic device 300 creates a 3D model in an augmented reality (AR) space that represents the object so that 3D advertisement may be overlaid on the object if desired.

Although FIG. 3 illustrates one example of electronic device 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs).

FIG. 4A illustrates a perspective view of a wearable device 400 in accordance with an embodiment of the present disclosure. Wearable device 400 could represent the electronic device 300 of FIG. 3. The wearable device 400 can be, for example, but not limited to, a head mounted device (HMD) suitable for wear in the form of glasses or goggles. The wearable device 400 can include a face plate 402 and a supporting part 404. The face plate 402 can be worn on a user's face. The face plate 402 can be supported to a user's face by various members. In one embodiment, the supporting part 404 is combined with the face plate 402 so as to support the face plate 402 to a user's face. The supporting part 404 allows the face plate 402 to be located around user's eyes. Additionally or alternatively, the supporting part 404 can be formed of eyeglass templates, helmets, or straps.

The face plate 402 can have a suitable form or structure for user's wear. For example, the face plate 402 can be configured to cover user's eyes and have a recess placing on a user's nose. The face plate 402 and/or the supporting part 404 can be formed of wearable and light material.

The face plate 402 and/or the supporting part 404 can include internally or externally the components of electronic device 300.

The wearable device 400 can include the camera 410 at the front of the face plate 402. Through the camera 410, the wearable device 400 can obtain an external image in a user's line of sight. The face plate 402 can include at least one lens 406 and 408. The lens 406 and 408 can operate as the display, such as display 355. The wearable device 400 can display an image through the lens 406 and 408. In another embodiment, the wearable device 400 can display an image by projecting light on the lens through a projector (not shown). The wearable device 400 can obtain a real image through the camera 410 located in a user's line of sight, analyze the obtained real image, and display augmented reality information corresponding to the analyzed real image on the lens 406 and/or 408.

Although FIG. 4A illustrates one example of a wearable device 400, other wearable devices may also be used. For example, as shown in FIG. 4B, an HMD 415 may include an electronic device 417 and an electronic device 419 according to an embodiment of the present disclosure. HMD 415 illustrates one example of an electronic device 300 that may be used with the embodiments of the present disclosure.

The electronic device 417 may include a display that displays an image of an environment that is captured by a camera. As will be discussed below, the electronic device 415 may receive an image of an environment and superimpose a 3D advertisement on the image before displaying it to a user.

The electronic device 417 may store a virtual reality application. For example, the electronic device 417 may be the electronic device 300 and include all the features of the electronic device 300 such as sensors 370 and internally and externally facing cameras 380. The virtual reality application may be an application which can provide a display similar to an actual reality to the user. According to an embodiment, the virtual reality application may display a left eye image and a right eye image corresponding to each of the user's eyes based on a stereo scheme.

The electronic device 419 according to an embodiment may include a housing 450 provided to be worn on the user's head, a blackout part 430 fixed to the housing and provided at an area corresponding to locations of the user's eyes, and at least one input button 421 provided at one area of the housing 450. The electronic device 402 may include an input pad 425 which may receive an input from the user such as a swipe, tap, or other input performed by a user.

The blackout part 430 provides a seal against external light from entering the space between a user's eyes and the electronic device 417. Thus, the user may position the user's eyes to fit closely to the blackout part 430 and, accordingly, the user may view the image by the virtual reality application provided from the electronic device 401 without any interference from external light.

The electronic device 417 may be coupled to the electronic device 419. The electronic device 417 may be connected to the electronic device 419 through a wire or wirelessly. For example, although the electronic device 401 may be connected to the electronic device 419 based on a USB connection. The aforementioned is merely an example and it may be easily understood by those skilled in the art that there is no limitation on the connection if data transmission/reception between the two devices 417 and 419 is possible through the connection. According to another embodiment, the electronic device 417 may be directly coupled to the electronic device 419 without the use of a wire or wireless connection.

Figure 5:
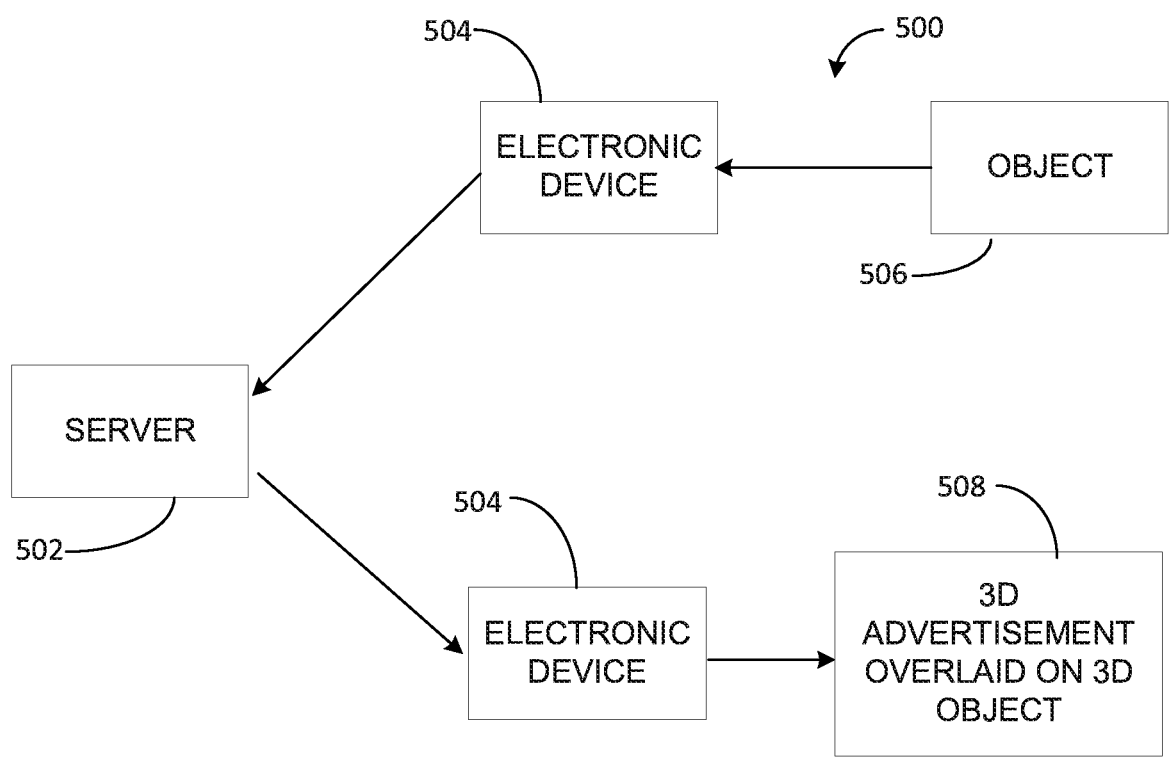
FIG. 5 illustrates an example system diagram according to this disclosure.

FIG. 5 illustrates an example system 500 according to this disclosure. As shown in FIG. 5, the system 500 includes a server 502 and an electronic device 504. The server 502 could represent the server 200 in FIG. 2, and the electronic device 504 could represent the electronic device 300 in FIG. 3.

As will be discussed below with reference to FIGS. 6 and 7, the electronic device 504 captures an image of an object 506. In an embodiment, the electronic device may transmit the image to server 502 and the server 502 may recognize the object 506 in the image. The server 502 may retrieve an asset from a database, generate an advertisement, and provide the 3D advertisement to the electronic device 504. The electronic device 504 would track the object 506 and overlay the 3D advertisement 508 on the object 506.

In another embodiment, the electronic device 504 may recognize the object 506 and retrieve a 3D asset from the server 502 before overlaying the 3D asset on the object.

Figure 6A:
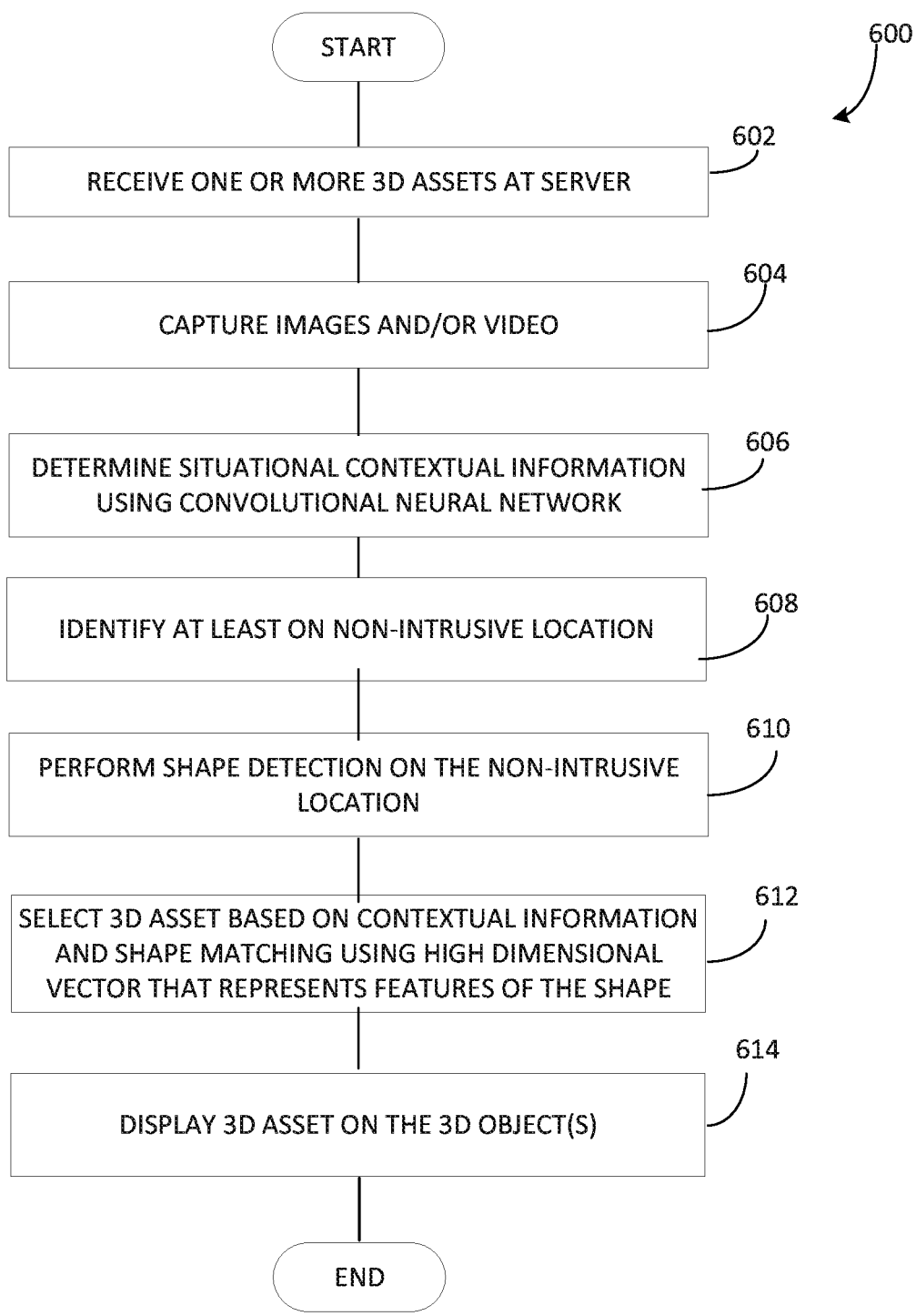
FIGS. 6A to 6C illustrate methods for overlaying an image according to this disclosure.
Figure 6B:
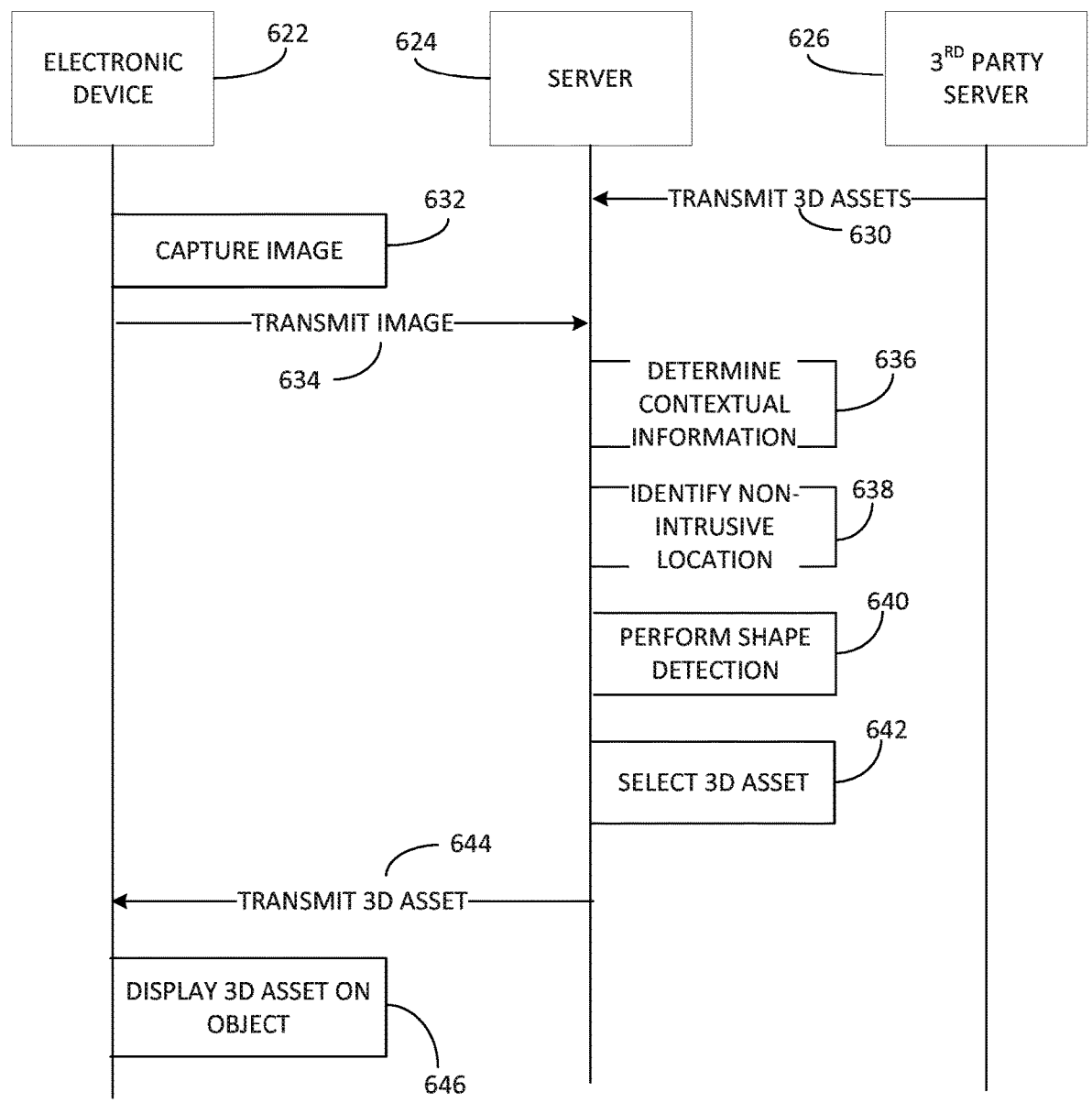
Figure 6C:
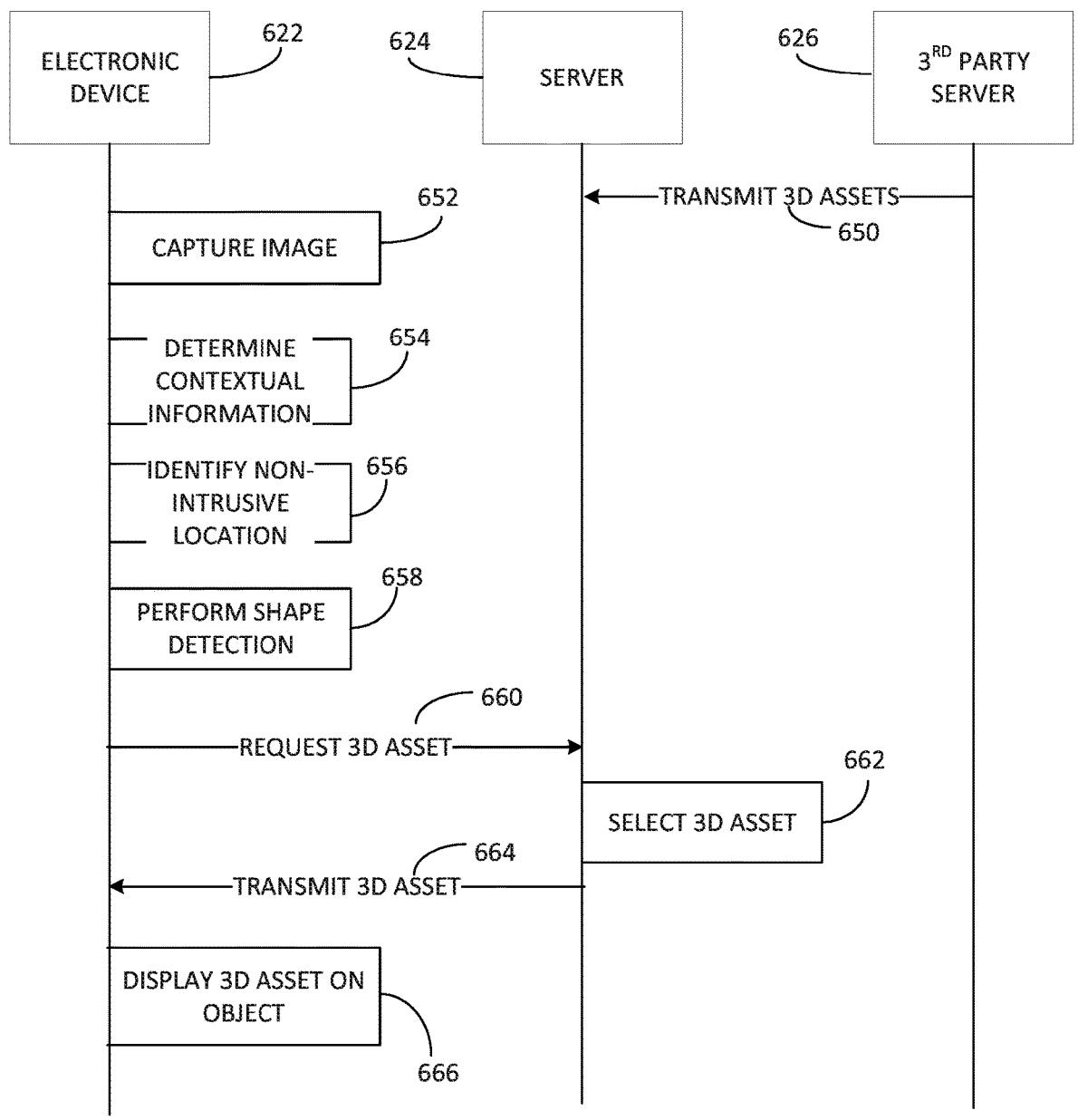

FIG. 6A to 6C illustrate methods for overlaying an image according to this disclosure. FIG. 7 illustrates a method 700 for detecting a shape according to this disclosure. The method 700 corresponds to operation 610 of FIG. 6. FIGS. 6 and 7 will be discussed while making reference to server 200 of FIG. 2 and electronic device 300 of FIG. 3.

As shown in FIG. 6A, the method 600 starts in operation 602 where one or more 3D assets are received by server 200. The 3D assets may represent products and/or services that are provided by an external source such as advertisers. Multiple 3D assets having different two-dimensional or three-dimensional shapes may be provided for each product and/or service.

In operation 604, the electronic device 300 captures a live image and/or video of an environment using camera 380. The live image represents a user's field of view being seen through an augmented reality device, e.g., wearable device 400 of FIG. 4, and includes a physical object on which a 3D advertisement may be overlaid.

In operation 606, the situational contextual information is determined in the captured image using a convolutional neural network. One example of a convolutional neural network may include four operations: convolution; non-linearity; pooling; and classification. In the convolution operation, features are extracted from an input image using a filter. In other words, a filter is applied to the input image to generate a feature map. Any number of filters may be used to generate any number of feature maps. In the non-linearity operation, all the negative pixel values in the one or more feature maps are replaced by zero. In the pooling operation, the dimensionality of each feature map is reduced using different types of pooling, such as, max pooling, average pooling, sum pooling, etc. In the classification operation, the features identified in the feature maps are classified into various classes based on a dataset or contextual information. The contextual information may include ambient lighting of the environment, the noise level of the environment, object color, and/or subject of the content in the image to determine related advertisements or user interest.

In operation 608, a non-intrusive area of the image is selected. The non-intrusive area may be an area on the peripheral edges of the image. The physical object that will be identified and have a 3D advertisement overlaid thereon is located in the non-intrusive area so that it does not obstruct a user's view in the user's line of sight.

In operation 610, shape detection is performed on the non-intrusive location to select an physical object in the non-intrusive location. The physical object is selected by executing an object segmentation algorithm and a generating a 3D point cloud as will be described below with reference to FIG. 7.

In operation 612, an asset is selected based on the contextual information and the 3D point cloud using shape matching. The contextual information may be used to select an asset from multiple assets. For example, if the ambient lighting in the image is low, an asset having a high illumination may be selected so that the resulting advertisement is easily noticed. In another embodiment, an asset may be selected to match or contrast the color of the identified physical object. In yet another embodiment, the asset may be selected based on the type of environment. For example, if a user is sitting in a restaurant, the selected asset may relate to food and/or beverages.

The asset may also be selected or retrieved based on shape matching using high dimensional vectors that represent the shape. For example, the 3D point cloud of the physical object is decomposed into a series of vectors. The series of vectors are then compared to a series of vectors that represent each asset. When the series of vectors for the asset is similar to the series of vectors for the 3D point cloud, the processor 210 selects that asset.

Once selected, the asset is displayed over the associated physical object in the user's field of view in operation 614. For example, in an embodiment, the electronic device 300 may track the location of the physical object in the user's field of view. When the physical object is identified, the asset is displayed on the display 355 at a position associated with the location of the physical object. If a user moves such that the user's perspective of the physical object changes, the electronic device may detect the user's movement and adjust the user's view of the asset to correspond to the user's movement. The user's movement may be detected by sensors 370 or by analyzing an image captured by the camera 380. In an embodiment, the user's view of the asset may be adjusted using simultaneous localization and mapping (SLAM) techniques. For example, in SLAM, a set of points are tracked through successive camera frames. Using these tracks, the 3D positions of the points are triangulated while simultaneously using the estimated point locations to calculate the camera pose which observed the points. Using the 3D positions and the camera pose, the user's view of the asset is also adjusted.

Although operations 606 through 610 are described as being implemented by the server 200, in some embodiments, operations 606 to 610 may also be performed by the electronic device 300. For example, the operations of identifying the physical object, retrieving the asset from server 200, and constructing an advertisement may be performed by the processor 340. In other embodiments, some combination of the server 200 and electronic device 300 may perform operations 606 to 610.

FIG. 6B illustrates a signal flow diagram of the method 700 according to one embodiment of the disclosure. As shown in FIG. 6B, a 3rd party server 626, which may belong to a company or advertising agency, transmits assets to be stored in server 624 in operation 630. In operation 632, the electronic device 622 captures an image and transmits the image to the server 624 in operation 634. The server 624 determines situational contextual information in operation 636 and identifies a non-intrusive location in operation 638. Once the non-intrusive location is selected, the server 624 performs shape detection in operation 640 to identify an object. In operation 642, an asset is selected based on the shape of the identified object and the situational contextual information. The asset is transmitted to the electronic device 622 in operation 644 and displayed on the electronic device in operation 646.

FIG. 6C illustrates a signal flow diagram of the method 700 according to another embodiment of the disclosure. As shown in FIG. 6C, a 3rd party server 626, which may belong to a company or advertising agency, transmits assets to be stored in server 624 in operation 650. In operation 652, the electronic device 622 captures an image. The electronic device 622 then determines situational contextual information in operation 654 and identifies a non-intrusive location in operation 656. Once the non-intrusive location is selected, the electronic device 622 performs shape detection in operation 658 to identify an object. In operation 660, the electronic device transmits a request for a 3D asset to server 624. The request may include the shape of the identified object and/or contextual information. In operation 662, the server selects an asset based on the shape of the identified object and the situational contextual information. The asset is transmitted to the electronic device 622 in operation 664 and displayed on the electronic device in operation 666.

Figure 7:
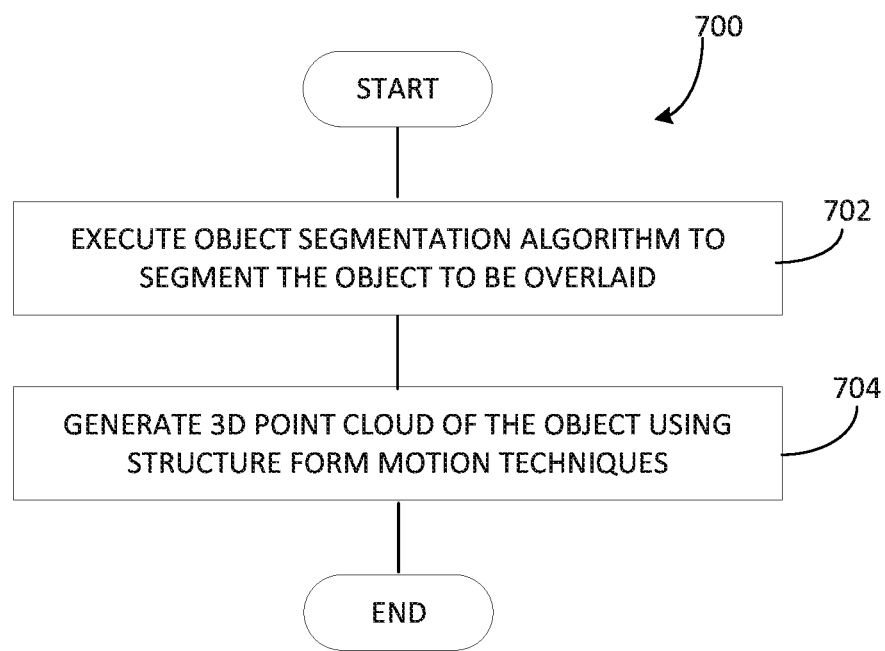
FIG. 7 illustrates a method for detecting a shape according to this disclosure.

Regarding FIG. 7, the operations of method 700 may be performed in either the server 200 or the electronic device 300. As shown in FIG. 7, shape detection begins Regarding FIG. 7, the operations of method 700 may be performed in either the server 200 or the electronic device 300. As shown in FIG. 7, shape detection begins in operation 702 where an object segmentation algorithm is executed by processor 210. The object segmentation algorithm is applied to the captured image to identify the physical object. Specifically, the captured image is partitioned into multiple segments to locate objects and boundaries (lines, curves, etc.) in the image. More precisely, every pixel in the captured image is assigned a label such that pixels with the same label share certain characteristics such as color, intensity, or texture. Adjacent pixels having the same or similar labels are grouped together and identified as an object.

In operation 704, a 3D point cloud is generated for the object identified in operation 702. The 3D point cloud is a set of data points in a coordinate system. For example, in a three-dimensional coordinate system, these points are usually defined by X, Y, and Z coordinates and are intended to represent an external surface of an object. The 3D point cloud is generated to represent an external surface of the identified physical object. In an embodiment, the 3D point cloud may be generated by selecting candidate points that are well distributed in the identified object and have a sufficient high image gradient magnitude with respect to their immediate surroundings. Then the candidate points are tracked in subsequent frames using a discrete search along a predetermined line. The search interval may be constrained by a depth and associated variance. After a set of old points are marginalized, new candidate points are activated to replace the marginalized points. During the 3D point cloud generation, potential outliers are detected and removed.

Although the above-described embodiments focus on overlaying a 3D advertisement on a physical object, the present disclosure is not limited to such embodiments. For example, in another embodiment, the assets stored in the server may include sound, voice-overs, slogans, jingles, music, etc. Instead of identifying a physical object in the image, a brand in the image (e.g., a Ford logo/car) may be identified. The electronic device may then retrieve an audio file as an asset and reproduce the audio file if the company has registered for advertisements in the database and provided the music/slogan as an asset.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   an image capture device configured to capture an image of an environment; and
   a processor coupled to the image capture device and configured to:
      receive the image of the environment,
      determine situational contextual information in the image using a neural network configured to classify features extracted from the image,
      identify at least one location within the image that does not obstruct a user's view in a user's line of sight and is located on a peripheral area of the image,
      perform shape detection on the at least one location to identify a shape of an object within the at least one location using an object segmentation algorithm configured to segment the object,
      select the object within the at least one location, and
      receive an advertisement asset based on the determined situational contextual information and having a shape matching the identified shape of the object.

2. The electronic device of claim 1, wherein, to perform the shape detection, the processor is configured to generate a three-dimensional point cloud of the object using data points in a coordinate system tracked through successive frames.

3. The electronic device of claim 1, wherein the situational contextual information includes at least one of: an ambient lighting condition of the environment, a noise level of the environment, a color of the object, or a subject of a content in the image.

4. The electronic device of claim 1, further comprising:
   a display coupled to the processor;
   wherein the processor is further configured to:
      render the received advertisement asset in three dimensions, and
      output the rendered received advertisement asset to the display in proximity to the at least one location and as a function of a viewing angle of the user.

5. The electronic device of claim 4, wherein the processor is further configured to track the at least one location in the environment.

6. The electronic device of claim 1, further comprising:
   an audio interface;
   wherein the advertisement asset includes an audio file and the electronic device is configured to reproduce the audio file using the audio interface.

7. The electronic device of claim 1, wherein the processor is further configured to:
   determine a similarity of the shape of the advertisement asset to the identified shape of the object based on high-dimensional vector analysis.

8. The electronic device of claim 1, wherein the processor is configured to select the advertisement asset from among a plurality of advertisement assets based on one or more of:
   lighting and color information in the situational contextual information; or
   a physical location of a user.

9. A method for displaying a three-dimensional (3D) image, the method comprising:
   receiving an image of an environment;
   determining situational contextual information in the image using a neural network configured to classify features extracted from the image;
   identifying at least one location within the image that does not obstruct a user's view in a user's line of sight and is located on a peripheral area of the image;
   performing shape detection on the at least one location to identify a shape of an object within the at least one location using an object segmentation algorithm configured to segment the object;
   selecting the object within the at least one location; and
   receiving an advertisement asset based on the determined situational contextual information and having a shape matching the identified shape of the object.

10. The method of claim 9, wherein performing the shape detection further comprises generating a three-dimensional point cloud of the object using data points in a coordinate system tracked through successive frames.

11. The method of claim 9, wherein the situational contextual information includes at least one of: an ambient lighting condition of the environment, a noise level of the environment, a color of the object, or a subject of a content in the image.

12. The method of claim 9, further comprising:
   rendering the received advertisement asset in three dimensions; and
   outputting the rendered received advertisement asset to a display in proximity to the at least one location and as a function of a viewing angle of the user.

13. The method of claim 12, further comprising:
   tracking the object in the environment.

14. The method of claim 9, wherein:

the advertisement asset includes an audio file, and the method further comprises reproducing the audio file using an audio interface.

15. An electronic device comprising:

a memory configured to store a plurality of advertisement assets; and a processor coupled to the memory and configured to:
- receive an image of an environment,
- determine situational contextual information in the image using a neural network configured to classify features extracted from the image,
- identify at least one location within the image that does not obstruct a user's view in a user's line of sight and is located on a peripheral area of the image,
- perform shape detection on the at least one location to identify a shape of an object within the at least one location using an object segmentation algorithm configured to segment the object,
- select the object within the at least one location, and
- select an advertisement asset from among the plurality of advertisement assets based on the determined situational contextual information and having a shape matching the identified shape of the object.

16. The electronic device of claim 15, wherein, to perform the shape detection, the processor is configured to generate a three-dimensional point cloud of the object using data points in a coordinate system tracked through successive frames.

17. The electronic device of claim 15, wherein the situational contextual information includes at least one of: an ambient lighting condition of the environment, a noise level of the environment, a color of the object, or a subject of a content in the image.

18. The electronic device of claim 15, wherein the processor is further configured to:

initiate transmission of the selected advertisement asset to another electronic device.

19. The electronic device of claim 15, wherein the selected advertisement asset includes an audio file.

20. The electronic device of claim 15, wherein the processor is configured to select the advertisement asset from among the plurality of advertisement assets based on one or more of:

lighting and color information in the situational contextual information; or a physical location of a user.

\* \* \* \* \*

UNITED STATES PATENT AND TRADEMARK OFFICE
CERTIFICATE OF CORRECTION

| | | |
|---|---|---|
| PATENT NO. | : 11,682,045 B2 | Page 1 of 1 |
| APPLICATION NO. | : 15/636360 | |
| DATED | : June 20, 2023 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 124 days.

Signed and Sealed this
Thirty-first Day of December, 2024

Derrick Brent
*Acting Director of the United States Patent and Trademark Office*